US010387468B2

(12) United States Patent
Clark et al.

(10) Patent No.: US 10,387,468 B2
(45) Date of Patent: *Aug. 20, 2019

(54) IDENTIFYING A STALE DATA SOURCE TO IMPROVE NLP ACCURACY

(71) Applicant: International Business Machines Corporation, Armonk, NY (US)

(72) Inventors: Adam T. Clark, Mantorville, MN (US); Joel C. Dubbels, Eyota, MN (US); Jeffrey K. Huebert, Rochester, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 625 days.

This patent is subject to a terminal disclaimer.

(21) Appl. No.: 13/804,734

(22) Filed: Mar. 14, 2013

(65) Prior Publication Data
US 2014/0280203 A1  Sep. 18, 2014

Related U.S. Application Data

(63) Continuation of application No. 13/796,616, filed on Mar. 12, 2013.

(51) Int. Cl.
G06F 16/33 (2019.01)
G06F 17/27 (2006.01)

(52) U.S. Cl.
CPC ...... *G06F 16/3344* (2019.01); *G06F 17/2785* (2013.01)

(58) Field of Classification Search
CPC .......... G06F 17/30684; G06F 17/3048; G06F 17/30902; G06F 17/30312; G06F 16/3344; G06F 17/2785
See application file for complete search history.

(56) References Cited

U.S. PATENT DOCUMENTS 6,463,429 B1 * 10/2002 Geppert et al.
6,601,026 B2 7/2003 Appelt et al.
(Continued)

FOREIGN PATENT DOCUMENTS

CN 101878476 A 11/2010
CN 102063452 A 5/2011

OTHER PUBLICATIONS

International Search Report and Written Opinion of the ISA dated Jun. 13, 2014—International Application No. PCT/IB2014/058910.
(Continued)

*Primary Examiner* — Samuel G Neway
(74) *Attorney, Agent, or Firm* — Patterson + Sheridan, LLP

(57) ABSTRACT

In some NLP systems, queries are compared to different data sources stored in a corpus to provide an answer to the query. However, the best data sources for answering the query may not currently be contained within the corpus or the data sources in the corpus may contain stale data that provides an inaccurate answer. When receiving a query, the NLP system may evaluate the query to identify a data source that is likely to contain an answer to the query. If the data source is not currently contained within the corpus, the NLP system may ingest the data source. If the data source is already within the corpus, however, the NLP may determine a time-sensitivity value associated with at least some portion of the query. This value may then be used to determine whether the data source should be re-ingested—e.g., the information contained in the corpus is stale.

8 Claims, 6 Drawing Sheets

(56) References Cited

U.S. PATENT DOCUMENTS

| | | |
|---|---|---|
| 7,065,524 B1* | 6/2006 | Lee |
| 7,562,009 B1 | 7/2009 | Emerson et al. |
| 8,140,335 B2 | 3/2012 | Kennewick et al. |
| 8,180,758 B1* | 5/2012 | Cornali .......... 707/707 |
| 8,266,148 B2 | 9/2012 | Guha et al. |
| 8,719,298 B2* | 5/2014 | Konig et al. .......... 707/771 |
| 2003/0200194 A1* | 10/2003 | Arnold et al. .......... 707/1 |
| 2004/0039798 A1* | 2/2004 | Hotz et al. .......... 709/219 |
| 2004/0133543 A1* | 7/2004 | Shlaes et al. .......... 707/1 |
| 2008/0021860 A1 | 1/2008 | Wiegering et al. |
| 2008/0228711 A1* | 9/2008 | Dettinger et al. .......... 707/2 |
| 2009/0043748 A1* | 2/2009 | Maghoul et al. .......... 707/5 |
| 2009/0204753 A1* | 8/2009 | Bridge et al. .......... 711/106 |
| 2009/0300286 A1* | 12/2009 | Synge .......... 711/118 |
| 2010/0077407 A1* | 3/2010 | Luu et al. .......... 719/318 |
| 2010/0332513 A1* | 12/2010 | Azar et al. .......... 707/769 |
| 2011/0004465 A1 | 1/2011 | Rose et al. |
| 2012/0016881 A1* | 1/2012 | Hrle et al. .......... 707/746 |
| 2012/0303699 A1 | 11/2012 | Luu et al. |
| 2013/0013587 A1* | 1/2013 | Xia et al. .......... 707/715 |
| 2014/0278351 A1* | 9/2014 | Clark et al. .......... 704/9 |
| 2014/0278352 A1* | 9/2014 | Clark et al. .......... 704/9 |
| 2014/0280203 A1* | 9/2014 | Clark et al. .......... 707/748 |
| 2014/0280253 A1* | 9/2014 | Clark et al. .......... 707/755 |

OTHER PUBLICATIONS

U.S. Appl. No. 13/796,562, entitled Detecting and Executing Data Re-Ingestion to Improve Accuracy in a NLP System, filed Mar. 12, 2013.

U.S. Appl. No. 13/709,413, entitled Electronic Document Source Ingestion for Natural Language Processing Systems, filed Dec. 10, 2012.

U.S. Appl. No. 13/796,616, entitled Identifying a Stale Data Source to Improve NLP Accuracy, filed Mar. 12, 2013.

* cited by examiner

IDENTIFYING A STALE DATA SOURCE TO IMPROVE NLP ACCURACY

CROSS-REFERENCE TO RELATED APPLICATIONS

This application is a continuation of co-pending U.S. patent application Ser. No. 13/796,616, filed Mar. 13, 2013. The aforementioned related patent application is herein incorporated by reference in its entirety.

BACKGROUND

The present invention relates to managing data sources in a corpus, and more specifically, to identifying new data sources for ingestion into the corpus or determining if a current data source stored in the corpus is stale.

Natural language processing (NLP) is a field of computer science, artificial intelligence, and linguistics concerned with the interactions between computers and human languages. To interact with humans, natural-language computing systems may use a data store (i.e., a corpus) that is parsed and annotated. For example, the computing system may use the corpus to identify an answer to a question posed by a human user by correlating the question to the annotations in the data store.

Before the NLP computing system is able to interact with a user, the corpus is populated with different text documents. In addition, annotators may parse the text in the corpus to generate metadata about the text. Using the metadata and the stored text, the NLP computing system can interact with the user to, for example, answer a posed question, diagnose an illness based on provided symptoms, evaluate financial investments, and the like. In a sense, the corpus acts like the "brain" of the natural-language computing system.

SUMMARY

Embodiments described herein include a system and a computer program product that receive a query for processing by a natural language processing (NLP) system comprising a corpus containing data ingested from a plurality of data sources. The system and computer program product identify a data source expected to contain an answer to the query by correlating one or more elements of the query to data previously ingested into the corpus from the data source. Upon determining that the ingested data in the corpus does not contain the answer to the query, the system and computer program product determine whether new material has been added to the identified data source since the last time the identified data source was ingested into the corpus. If so, the system and computer program product re-ingest the identified source whereby the new material is inserted into the corpus. The system and computer program product compare the query to the corpus to determine if the new material contains an answer to the query.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
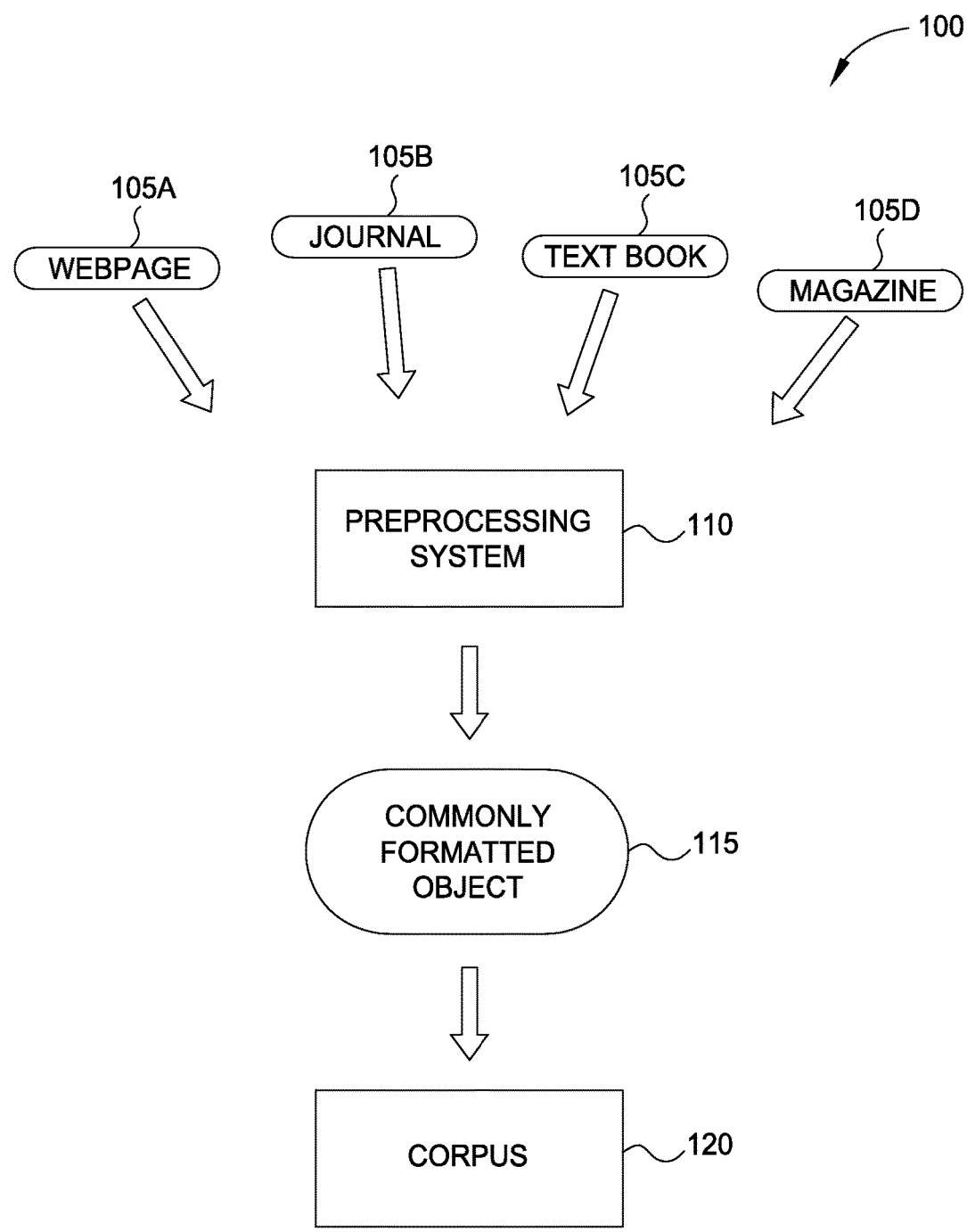
FIG. 1 is a flow chart for ingesting documents from a data source into a corpus of a NLP system, according to one embodiment described herein.

A data store for a natural language processing (NLP) system may include information that originates from a plurality of different data sources—e.g., journals, websites, magazines, reference books, textbooks, and the like. In one embodiment, the information or text from the data sources are converted into a single, shared format and stored as objects in a data store (i.e., a corpus). For example, an article in a journal may be formatted differently than an entry in an encyclopedia. Moreover, different journals may have different formats for printing their respective articles. Thus, in order to ingest the different documents with their respective formats, a NLP system may preprocess the documents to change the different formats into a normalized format (also referred to herein as a "common format"). As used herein, a data source's format includes the manner in which the text is arranged. The format may include different formatting elements such as section headers, paragraph headers, elements in a mark-up language (e.g., HTML and XML tags), and the like. Additionally, the format used by a data source may specify a particular hierarchy or order of the formatting elements—e.g., an introduction section followed by a general discussion section followed by a conclusion section. This process of adding to data source to the corpus is referred to generally herein as ingestion.

Once the data sources are ingested, a received query may be annotated and compared to the data stored in the corpus. Based on this comparison, the NLP system may identify one or more answers to the query in the corpus. In some instances, however, a data source that contains an answer to the query may not be contained within the corpus, or the corpus may contain stale data that provides an inaccurate answer. When receiving a query, the NLP system may evaluate the query to identify a data source that may contain an answer to the query. If the data source is not currently contained within the corpus, the NLP system may ingest the data source. If the data source has already been ingested into the corpus, the NLP may determine a time-sensitivity value associated with at least some portion of the query. This value may then be used to determine whether the data source should be re-ingested—e.g., the information contained in the corpus may be stale.

In another embodiment, after the NLP system compares a query to the corpus to identify an answer to the query, the NLP system may attempt to identify one or more supplemental data source that may contain a more accurate answer. To do so, the NLP system may identify one or more concepts associated with the different elements in the query and use these concepts to filter through the different data sources stored in the corpus. In this manner, the NLP system can identify data sources that are related to the query and may, if updated, contain a supplemental answer to the query. The NLP system may then determine if new data has recently been added to the data source. If so, the NLP system may re-ingest the data source and again compare the query to the corpus to determine if the re-ingested data source contains an answer that may be better than the answers that were identified previously. In this manner, the NLP system may augment the answers found originally by re-ingesting data sources into the corpus and re-evaluating the query against the updated corpus.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the data store) or identified available in the cloud. For example, the preprocessor that populates the data store could execute on a computing system in the cloud and receive the particular text documents. In such a case, the use could transmit the text documents to the preprocessor which then generates the data store at storage location in the cloud. Doing so allows a user to access this information from any computing system attached to a network connected to the cloud (e.g., the Internet).

FIG. 1 is a flow chart 100 for generating a corpus for a NLP system, according to one embodiment described herein. The flow chart receives text documents (e.g., electronic files, portable document format (PDF) files, flat text files, HTML text, and the like) from a plurality of different data sources 105A-105D which may arrange the text according to respective formats. For example, the webpage 105A may represent different web pages that are retrieved from a particular domain, e.g., Wikipedia® (a registered trademark of the Wikimedia Foundation). The domain may include multiple webpages that are each directed to a specific topic. Although not shown in FIG. 1, a webcrawler may discover each webpage 105A and transmit these pages to the preprocessor system 110 as respective text documents. The domain associated with the webpage 105A may define a particular format that is shared by all the webpages 105A of that domain. For example, the webpage 105A may include title tags (<title>TITLE</title) followed by body tags (<body>), header tags (<h1> . . . <hN>), and the like. Thus, the data sources 105 may have a predictable format that may be used to parse and identify the relevant text.

The other data sources shown in FIG. 1 may have formats that arrange text differently relative to the webpages 105A. For example, the journal 105B may always use the same format when publishing articles. The format may include, for example, the same primary headers or formatting elements—e.g., introduction, analysis, conclusion, and references—arranged in a particular order. Additional formats may be identified for text documents (e.g., articles, pages, sub-pages, or topics) received from the other data sources. For example, a plurality of electronic pages from an encyclopedia may be transmitted to the preprocessing system 110 which uses a parser to a scan the pages to identify different topics and the text associated with those topics. For example, the encyclopedia may use a special font or spacing when introducing a new topic. Using these known characteristics of the format, the preprocessing system 110 may identify portions of the page that correspond to each topic.

The preprocessing system 110 receives the various text documents and uses the respective formats to identify relevant text. In one embodiment, the preprocessing system 110 may include respective code portions referred to herein as extension classes that correspond to each of the formats. A more detailed explanation of extension classes is described in U.S. patent application entitled "ELECTRONIC DOCUMENT SOURCE INGESTION FOR NATURAL LANGUAGE PROCESSING SYSTEMS" 13/709,413 which was filed on Dec. 10, 2012 and is hereby incorporated by reference in its entirety. Using the extension class, the preprocessing system 110 identifies the relevant text and associates the text with a formatting element in a normalized (or common) format. The preprocessing system 110 generates objects 115 (e.g., NLP objects) that are commonly formatted. That is, regardless of the particular format used to arrange the received text, in the NLP object 115, the text may be arranged based on a shared format between all the objects 115. For example, the preprocessing system 110 may generate a new object 115 for each topic received from a data source (e.g., an article about breast cancer or a webpage about treating prostate cancer). If, however, there is already an object 115 assigned to that topic, the preprocessing system may store the new text into the already existing object 115. The preprocessing system 110 arranges the text in these documents into the normalized format where each document is categorized in the object 115. In one embodiment, the object 115 may be an individual source common analysis system (CAS) data structure as defined by the Unstructured Information Management Architecture (UIMA), an OASIS standard. Once the text documents are ingested (i.e., the text is arranged into the objects 115), the preprocessing system 110 may place the object 115 or CAS into the corpus 120.

Selectively Ingesting or Re-Ingesting Data Sources into a Corpus

Figure 2:
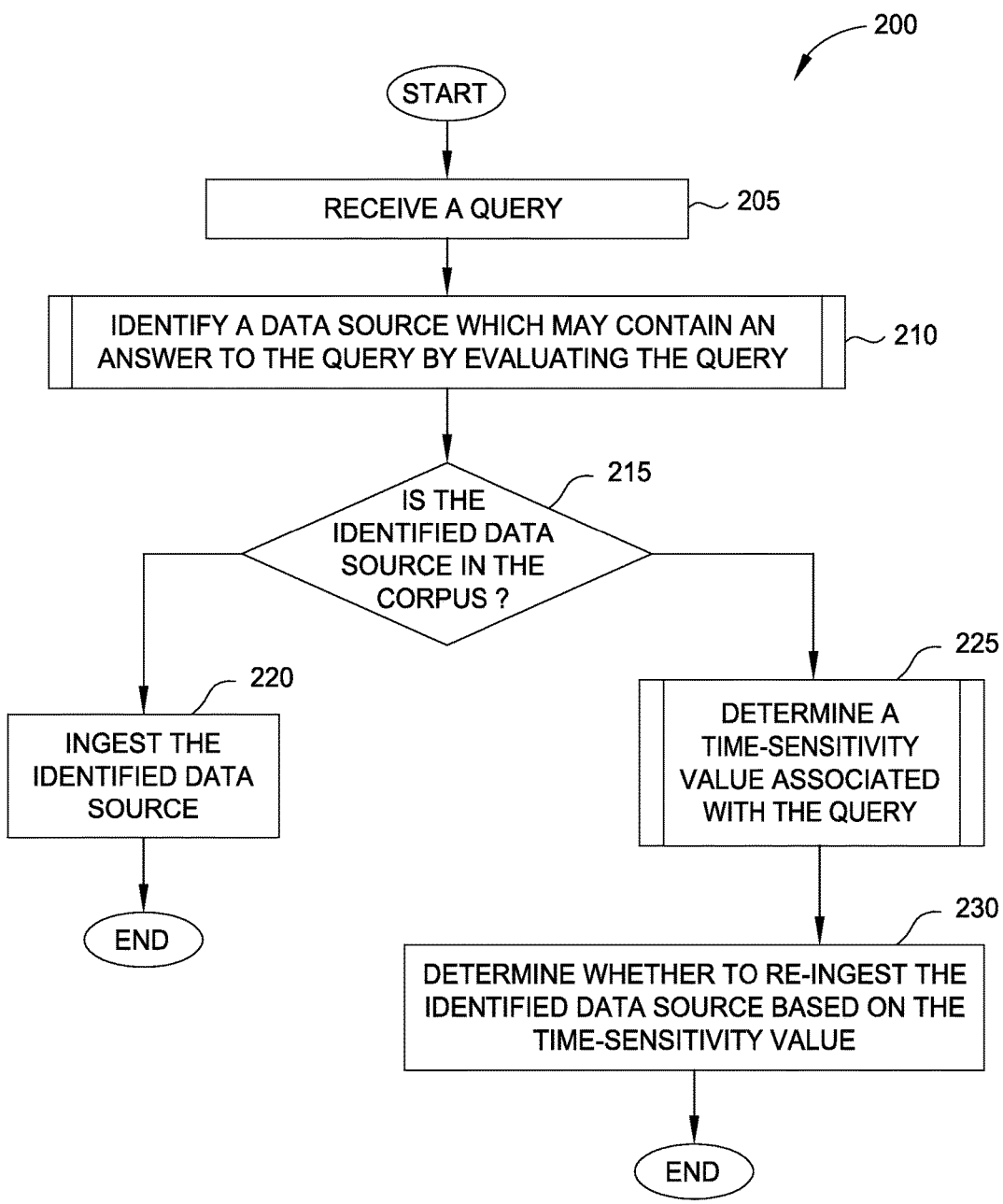
FIG. 2 is a flow chart for identifying a data source for ingestion or re-ingestion into the corpus, according to one embodiment described herein.

FIG. 2 is a flow chart for identifying a data source for ingestion or re-ingestion into the corpus, according to one embodiment described herein. Generally, the ingestion process refers to the technique used for adding one or more documents, files, web-pages, and the like associated with a data source to the corpus of a NLP system. FIG. 1 illustrates one such example for ingesting documents. The terms "ingesting" and "re-ingesting" may be used to distinguish between data sources that are added to the corpus for the first time versus data sources that have been previously ingested. That is, "ingesting a data source" may refer to the first time documents from a particular data source have been added to the corpus while "re-ingesting a data source" refers to again performing the ingestion process for documents associated with the data source. Re-ingesting a data source may include ingesting new documents that were added to the data source or updating documents that were previously added to the corpus but have since changed (or both).

At block 205, a NLP system may receive a query. The query may be phrased as a question (though this is not necessary) and based on a particular language for human communication—e.g., English, French, Russian, etc. In one embodiment, the query may be submitted by a user either directly or indirectly. For example, the user may type the query onto a personal computer which then sends the query to a NLP system for processing, or the user may communicate directly with the NLP system, e.g., the system may include a voice-recognition application that captures a user's spoken query. Based on the different elements in the query (i.e., the words or phrases in the query), the NLP system may search the corpus to identify an answer to the query.

At block 210, the NLP system identifies a data source which may contain an answer to the query by evaluating the elements within the query. For example, the NLP system may parse the query and identify data sources based on the elements within the query or from deriving concepts based on these elements. For example, the query may ask "what is price of IBM's BladeCenter HX5?" Here, a data source can be directly derived from the elements in the query—i.e., a website or pricing database associated IBM® products (IBM is a registered of International Business Machines in the United Stated and other jurisdictions). In other embodiments, a relevant data source (or sources) may be identified by indirectly deriving information from the query such as a general topic associated with the query. A more detailed explanation of this block may be found in the discussion accompanying FIG. 3.

At block 215, the NLP system may determine whether the data source identified at block 210 is currently located in the corpus—i.e., whether the data source has been previously ingested. If not, at block 220, the NLP system may ingest the data source. If the data source has been ingested, the NLP system may perform further analysis to determine whether the data within the corpus is stale. At block 225, the NLP system may determine a time-sensitivity value associated with the query. In one embodiment, the query may specify a time or duration—e.g., "What is the temperature in Rochester, Minn. yesterday?" Because the word "yesterday" indicates that the answer needs to come from a data source that was ingested since yesterday, the NLP system may set a high time-sensitivity value. The high time-sensitivity value may indicate, for example, that the staleness of the data source used to provide the answer may have a large impact on the accurateness of the answer. In contrast, if the query is whether an actor won a certain award in 2010, the NLP system may set a low time-sensitivity value to the query since the data source identified at block 210 needs only to have been updated since 2010 to have this answer. A more detailed explanation of block 225 is provided in the discussion accompanying FIG. 4.

At block 230, the NLP system may determine whether to re-ingest the identified data source based on the time-sensitivity value. For example, the NLP system may re-ingest the data source if the time-sensitivity value satisfies a predefined threshold. In other embodiments, the NLP system may include other factors, such as an estimated time required to re-ingest the data source, when deciding whether to re-ingest the data source. For example, even if the time-sensitivity value is high, the NLP system may not re-ingest the data source if the estimated time is twenty minutes. Alternatively, if the time-sensitivity value is low, the NLP system may still re-ingest the data source if the estimated time is only a few seconds (e.g., the NLP system only has to ingest a small document). Other factors that may be considered before re-ingesting a data source include a time-importance associated with the query (i.e., whether the requesting entity needs an answer immediately or if the answer can be delayed to allow for re-ingestion), whether the NLP system has already identified a reliable answer from a different data source, or the ability of the NLP system to perform the re-ingestion based on the current utilization of the system's hardware resources. In one embodiment, the factors discussed above may also be used by the NLP system to determine whether to ingest a new identified data source at block 220. For example, if ingesting the new data source is estimated to take more than a minute, the NLP system may choose not to ingest the data source. Instead, the NLP system may rely only on the data sources already ingested into the corpus to provide an answer to the query.

In one embodiment, the NLP system may provide a user with various options before ingesting a new data source at block 220 or re-ingesting an old data source at block 230. In the situation where the NLP system wants to ingest a new data source, the system may ask the user for permission to ingest the source. Doing so provides the user with an opportunity to answer the query with only existing sources rather than waiting for a new source to be ingested. In this scenario, the NLP system may display the estimated time for ingesting the source and let the user select whether to ingest the source. In addition, the NLP system may evaluate the query, determine an answer, and display this answer to the user before asking the user whether she would like to ingest a new source that may have a more accurate answer. Continuing the example provided above, the NLP system may use a data source already in the corpus (e.g., a website for selling secondhand electronics) to provide the price of a used BladeCenter HX5. When displaying this price, the NLP system may state that a more accurate price may be found if IBM's website (e.g., the data source identified at step 210) is ingested into the corpus. In another embodiment, the NLP system may provide a HTML link to the data source where the user can attempt to answer the query herself. Moreover, the options discussed above may also be provided to the user in the case where the NLP system is unable to find any answer to the query.

In the situation where the NLP system wants to re-ingest a currently stored data source, the system may display an estimated time for ingesting the source and let the user decided whether to ingest a data source that may have been updated which provide a more accurate answer. Moreover, the NLP system may have previously processed the query using the un-updated data source in the corpus. If an answer was found, the NLP system may display the answer to the user but state that the NLP system has determined that the answer may be stale. For example, if the query asks for the most recent score for a sports team, the NLP system may display the answer based on searching an ingested sports website. However, because the query asks for the most recent score, the NLP system may display the most recent score found along with the date, but ask the user whether she would like to wait for the NLP system to re-ingest the data source and re-process the query based on the updated corpus to ensure the answer is accurate.

In one embodiment, method 200 may be performed before the NLP system processes the query. That is, method 200 may be a pre-processing technique used for determining whether the corpus should be updated before searching the corpus to identify an answer to the query. Alternatively, method 200 may be performed after or in parallel with searching the corpus to identify an answer to the query. In one example, the NLP system may perform at least a portion of method 200 after the system has already determined an answer for to the query. The NLP may determine based on some confidence parameter, however, that the answer may be inaccurate. In response, the NLP system may perform method 200 to determine if the corpus should be updated by ingesting a new data source or re-ingesting a current data source (or both) to potentially find a more accurate answer to the question when the query is reprocessed.

Figure 3:
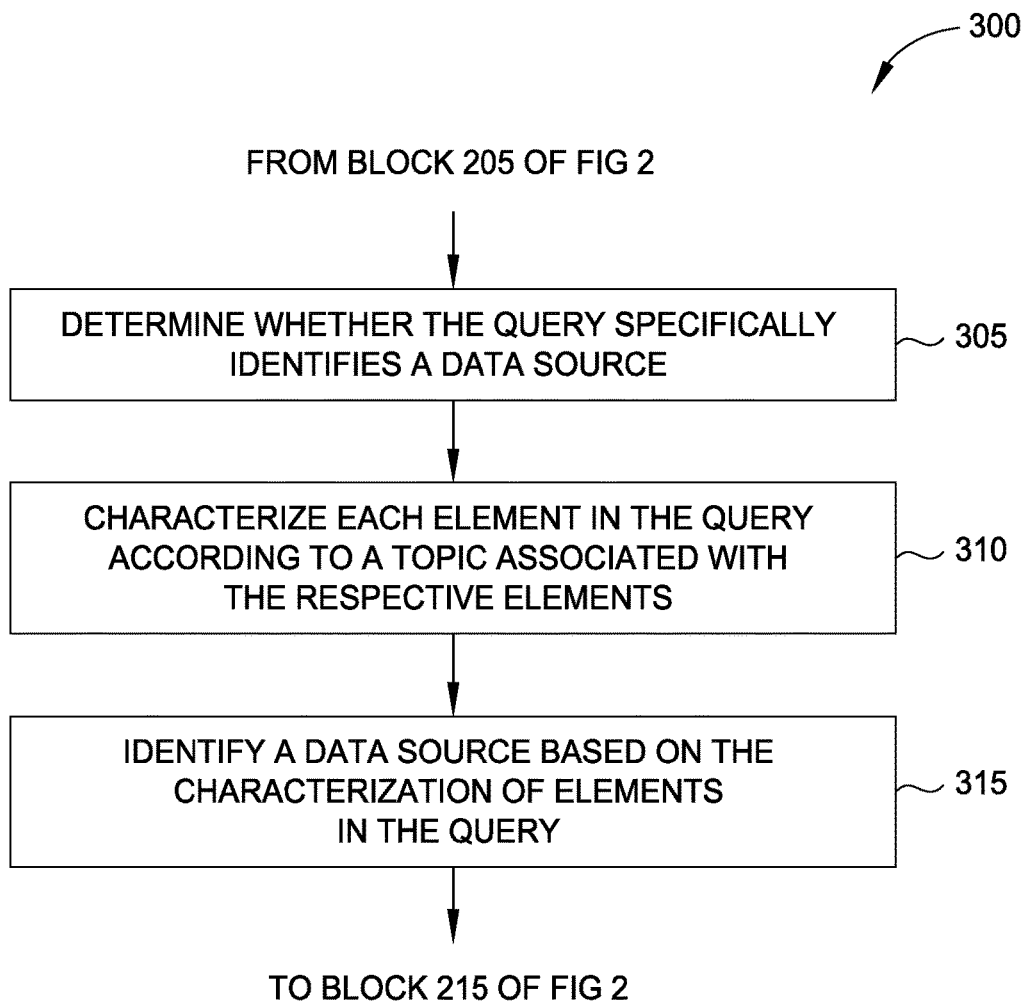
FIG. 3 is a flow chart for identifying a data source by characterizing elements in a received query, according to one embodiment described herein.

FIG. 3 is a flow chart for identifying a data source by characterizing elements in a received query, according to one embodiment described herein. Specifically, method 300 is a more detailed explanation of a technique that the NLP system may perform during block 210 of FIG. 2. At block 305, the NLP system may parse the elements of a query to determine whether the query specifically mentions a data source. An element of the query may be a single word or a plurality of related words (e.g., a phrase). The embodiments discussed herein may use any NLP technique for dividing words of a query into different elements.

The NLP system may evaluate each of the elements to see if the elements correspond to a particular data source. In one embodiment, the NLP system may search a specific database (e.g., a list of companies registered in a country) or the Internet to determine if one of the elements is a data source. For example, if the query contains the word IBM, the NLP system may do a web search to identify one or more data sources associated with IBM—e.g., IBM's website, press releases about IBM, publications by IBM, etc. The NLP may flag these different data sources for ingestion into the corpus. In this manner, the elements in the query may be parsed to directly derive different potential data sources that may contain an answer to the query.

At block 310, the NLP system may characterize each element in the query according to a topic associated with the respective elements. In one embodiment, the NLP system may annotate each of the elements in a query. As part of this process, the NLP system may assign the element to a particular topic or provide a generic description of the element. For example, a period of time (e.g., two hours) may be annotated as a time or a duration. A person's name may be annotated by their job or profession (e.g., an actor or politician). These annotations are metadata or derived data that elaborates on the underlying element in the query. Based on this metadata or characterization of the elements in the query, the NLP system may indirectly identify a data source related to the query.

At block 315, the NLP system may use the characterization of the individual elements to search for related data source. In one embodiment, the NLP system may maintain a list of possible data sources that have not been ingested into the corpus. For example, the NLP system may have determined previously that a particular data source is not relevant enough to the types of queries the NLP system typically answers to warrant ingesting the data source into the corpus. Nonetheless, the NLP system may add the data source into a table along with a brief description of the source—e.g., its title or an abstract describing the source. The NLP system may search the table based on the characterization of an element to see if there is a match in the table. For example, the NLP system may decide not to ingest a data source which includes biographies for famous actors, but instead add a description of the data source into the aforementioned table. If the NLP system later receives a query where one of the elements is characterized as an actor, the NLP system may search the table and flag the data source containing the biographies as a potential source for ingestion. Additionally, the NLP system may search the current data sources in the corpus to see if one of these sources matches or relates to the characterizations of one of the elements. If so, the NLP system may flag the data source for further evaluation (i.e., to determine whether the data source should be re-ingested).

In another embodiment, the NLP system may search the Internet using the characterizations to identify a new data source not in the corpus. For example, the NLP system may input the characterizations of the elements (e.g., all the different topics associated with the elements) into a search engine and evaluate the results. The NLP system may generate a summary of the different websites identified by the search engine and compare the summaries to the characterizations of the elements. If the characterizations and the summaries are similar, the NLP system may then flag the domain of the website as a potential new data source for the corpus.

Although method 300 was discussed in the context of identifying a single data source, the NLP system may use method 300 to identify a plurality of data source which may be new data sources or data sources previously ingested into the corpus. After identifying one or more candidate data sources, method 300 may return to block 215 of FIG. 2 to determine what action is appropriate.

As shown, method 300 illustrates performing block 310 (i.e., identifying a data source indirectly based on a characterization of the elements in the query) after performing block 305 (i.e., identifying a data source directly by recognizing a data source in the query); however, in one embodiment, the NLP system may perform only one of these techniques rather than performing both as shown in method 300. For example, the NLP system may assume that data sources specifically mentioned in the query are the most relevant and go directly to block 215 of FIG. 2 if the system identifies any data sources at block 305. Alternatively, the NLP system may first attempt, based on a characterization of the elements, to identify new data sources. If unsuccessful, the system may then determine if the query specifically includes a data source.

Figure 4:
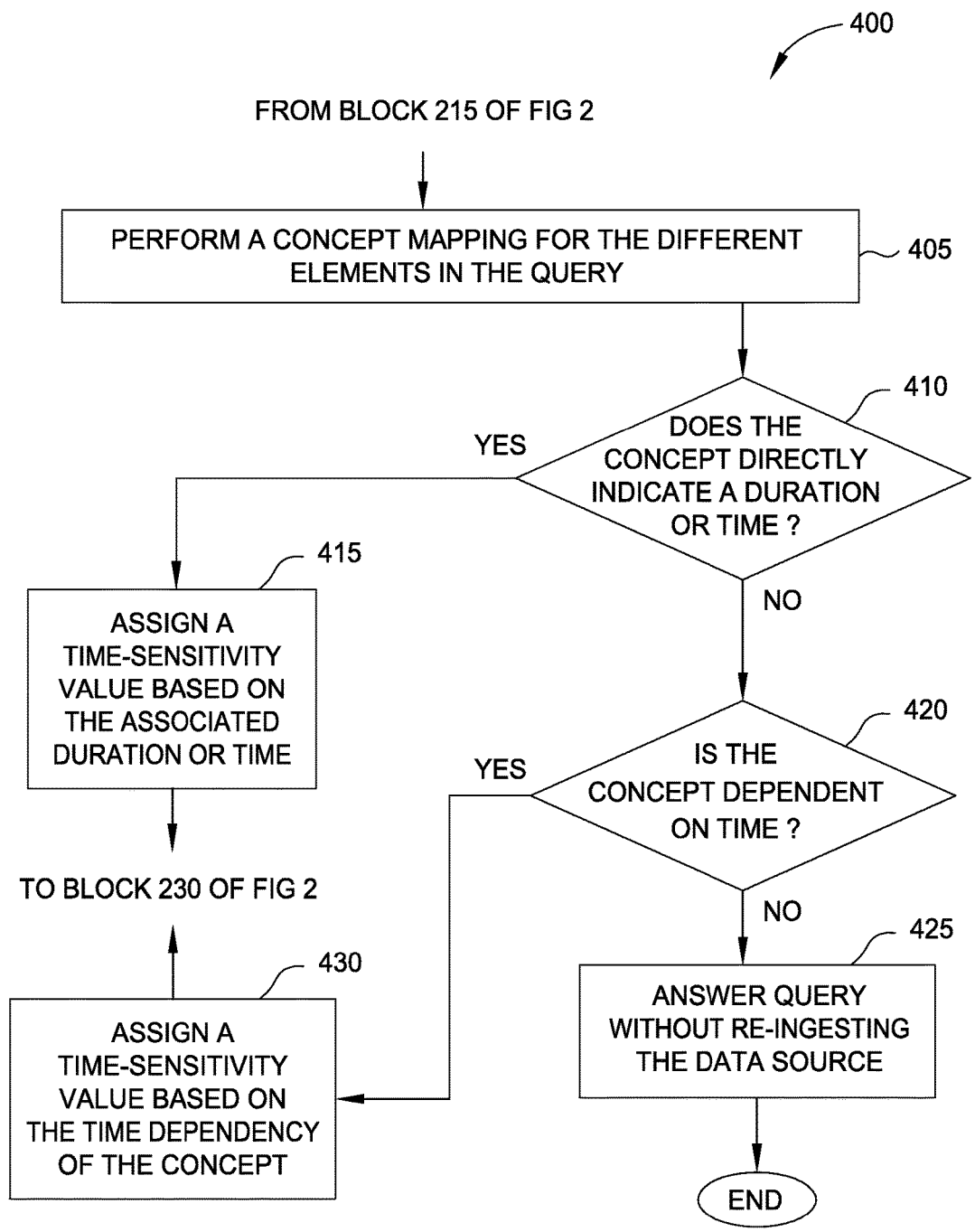
FIG. 4 is a flow chart for assigning a time-sensitivity value to a query to determine whether to re-ingest a data source, according to one embodiment described herein.

FIG. 4 is a flow chart for assigning a time-sensitivity value to a query for determining whether to re-ingest a data source, according to one embodiment described herein. Specifically, method 400 is a more detailed explanation of a technique that the NLP system may perform during block 225 of FIG. 2. Accordingly, method 400 may begin after determining that a data source identified at block 210 of FIG. 2 is already in the corpus. At block 405, the NLP system performs a concept mapping for the different elements in the query. In one embodiment, the concept mapping may be similar (or the same) as the characterization performed at block 310 of FIG. 3. Much like annotating the elements in the query to provide a description of the elements, the NLP system may assign a concept to each element. In one embodiment, the NLP system may identify a lexical answer type which is a word or noun phrase in the query that predicts the type of the answer. One way of filtering potential answers to a query is to see if the potential answers are the same type as the lexical answer type. For example, if a received query is "how much is a 40 inch television," the NLP may identify the lexical answer type of this query as a price. Accordingly, any potential answer should also be associated with price. Based on this NLP technique or any other suitable technique, the NLP system may assign a concept to each element in the query or to the query as a whole.

At block 410, the NLP system may determine whether the assigned concept or concepts are associated with a duration or time frame. The query may, for example, stipulate a length of time (e.g., six months, two days, five hours, "how long", etc.) or a time frame (1942, last week, Dec. 25, 2012, current/present, yesterday, etc.) which may be mapped to a concept related to time or duration. At block 415, the NLP system assigns a time-sensitivity value based on the time-related data expressed in the query. For example, the NLP system may assign a high time-sensitivity value if the time-related data happened recently. To do this, in one embodiment, the NLP system may associate the time-related data in the query to a fixed reference point—e.g., the current date. A query that asks "how long was Neil Armstrong on the moon" may have a lower time-sensitivity value compared to a query that asks "how long was yesterday's power outage". Even though these two queries contain the same time-related data—e.g., the phrase "how long"—the term "yesterday" in the latter query indicates that this query is much more dependent on when the underlying data sources have been updated than the former query related to Neil Armstrong's moon landing. Thus, by fixing the time-related data in the queries to the current date, the NLP system may assign a customized time-sensitivity value to one or more elements in the query or the query as a whole.

If the concept mapping does not result in directly identifying time-related data, at block 420, the NLP system may determine if the concepts associated with the elements may be dependent on time. Stated differently, the ability to accurately answer queries associated with certain concepts may depend on the staleness of the data sources containing the answers. For example, the query asking "who is the top ranked college basketball team" does not directly include time-related data. However, the concept of "rank" is dependent on time since, during basketball season, the number one ranked team may change on a weekly basis. Accordingly, the NLP system may infer from the concepts the appropriate time-sensitivity value. For example, the NLP system may include a predefined table that lists concepts that are dependent on time (e.g., rankings, stock quotes, movie theater screenings, prices, etc.). If the elements in the query are associated with any of these concepts, than the NLP system may assign a higher time-sensitivity value.

In other embodiments, the NLP system may combine (or consider independently) the verb tense and the concepts to determine a time-sensitivity value. In the previous example, the verb "is" may also be used to influence the time-sensitivity score. On the other hand, if the words in the query use a past-tense structure, the NLP system may decrease the time-sensitivity score. In addition to the verb tense, other factors may be considered to set the time-sensitivity value. For example, if the query includes a historical event, when that event occurred may be used to assign the time-sensitivity value. Thus, the NLP system may combine a variety of different factors or considerations with concept mapping in order to generate a time-sensitivity value for the query. Once the time-sensitivity value is assigned, the NLP system may proceed to block 230 of FIG. 2 to determine whether to re-ingest the identified data source based on the time-sensitivity value. For example, the NLP system may compare the time-sensitivity value to a threshold value or compare the value to a timestamp in the corpus indicating the last time the data from the data source was updated.

If, however, the NLP system does not identify any time dependent concepts in the query, method 300 proceeds to block 425 where the NLP system may answer the query without re-ingesting the identified data source. In one embodiment, the NLP system may, when answering the query using the identified data source, inform the user the last time the data source was updated (e.g., a timestamp). The user may then independently determine that the data source is stale and request that the NLP system re-ingest the data source and re-process the query.

Augmenting Candidate Answers by Re-Ingesting a Data Source

Figure 5:
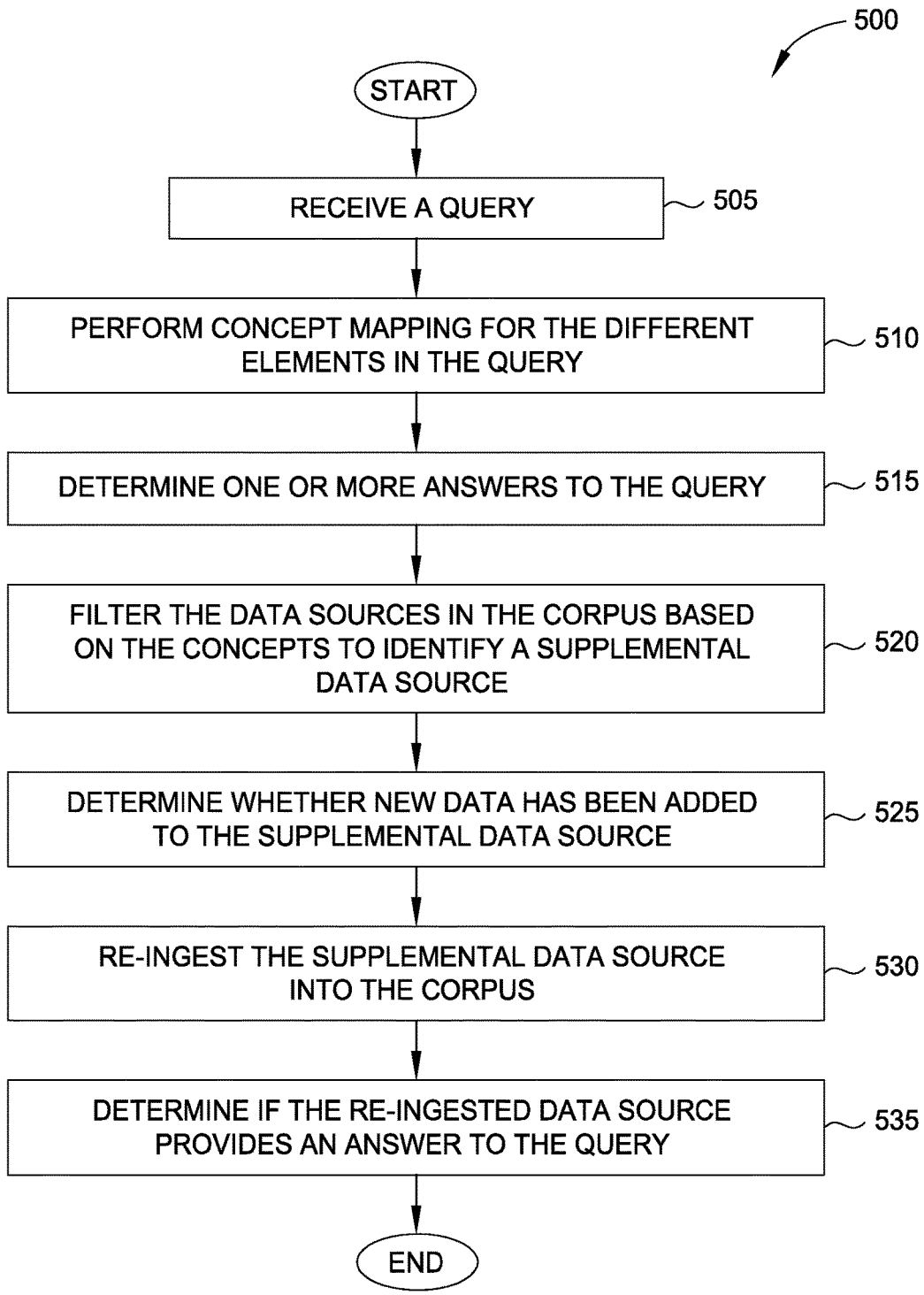
FIG. 5 is a flow chart for determining when to re-ingest a data source to provide supplemental answers to the received query, according to one embodiment described herein.

FIG. 5 is a flow chart for determining when to re-ingest a data source to provide supplemental answers to the received query, according to one embodiment described herein. At block 505, the NLP system receives a query from, for example, a human user. At block 510, the NLP system performs concept mapping for the different elements in the query or for the query as a whole. In one embodiment, the concept mapping performed at block 510 of method 500 may be the same or similar to the concept mapping performed at block 405 of FIG. 4. Alternatively, method 500 may characterize the different elements to identify a topic associated with the elements as discussed at block 310 of FIG. 3.

At block 515, the NLP system determines one or more answers to the query. That is, using any NLP technique, the system may compare the elements in the query to the corpus to identify potential answers to the query. In one embodiment, the NLP system may also associate confidence scores to each of the answers which indicate the trustworthiness of the answers. The NLP system may determine based on the confidence scores whether to augment the answer by determining whether the one or more data sources that provide the answer should be re-ingested. For example, the NLP system may include a predefined threshold value that is compared to the answers. If the answers' confidence scores do not satisfy or exceed the threshold, the NLP system may determine to augment the answers by determining if the data sources that provided the answers are stale. That is, the confidence scores may be improved if the data sources are re-ingested to include updated data.

In one embodiment, method 500 may be performed even if no answers were found when comparing the query to the corpus. That is, because none of the data sources in the corpus currently contain an answer, the NLP system may attempt to determine one or more data sources to re-ingest. Further still, method 500 may be performed before determining an answer to the query. Stated more generally, the NLP system may perform method 500 independent of the results of comparing the query to the corpus. In this situation, the NLP system may, each time a query is received, use the concept mapping done at block 510 to identify data sources related to the query that are stale and may need to be re-ingested.

At block 520, the NLP system may filter the data sources in the corpus based on the concepts identified in the query. That is, in addition to determining whether to re-ingest data sources that have already provided an answer at block 515, the NLP system may determine whether other data sources which did not provide an answer, but are nonetheless related to the query, should be considered. Assume that a query asks what dosage of a particular drug is appropriate for treating breast cancer. The NLP system may identify certain concepts based on the query such as "dosage", "treating", "breast cancer", "cancer", etc. When ingesting a data source, the NLP system may generate a summary of the data source or key concepts of the data source. Accordingly, the NLP system may cross-reference the concepts identified in the query with the summaries of the sources in the corpus. When doing so, the NLP system may identify a data source that is generally related to drugs used for treating breast cancer. On the other hand, sources in the corpus that do not include these concepts may be deemphasized—e.g., sources related to allergies or sports-injuries may be filtered out. In this manner, the NLP system may identify one or more supplemental data sources that currently do not answer the query but are expected to have an answer to the query based on the similarities between the concepts in the query and a general description of the supplemental data source.

At block 525, the NLP system determines whether the supplemental data source has been updated. For example, the supplemental data source may be a journal that has published another article or released a new issue since being ingested. In one embodiment, the NLP system may compare a date associated with the data source to a timestamp in the corpus indicating when the data source was last ingested. To identify a date associated with the data source, the NLP system may use a web-crawler to identify when the web pages in a domain have been updated, query a database to retrieve timestamps for the data stored in the database, parse an electronically digitized document (e.g., a PDF of a journal), and the like.

If the NLP system determines that the date associated with the data source is more recent than the timestamp, the system may, at block 530, re-ingest the data source. In one embodiment, the NLP system may re-ingest only a portion of the data source (e.g., a new article or the most recent issue) rather than re-ingesting the entire data source (e.g., all the volumes of a data source).

In one embodiment, the NLP system may provide a user with various options before re-ingesting the supplemental data source at block 530. The NLP system may, for example, ask the user for permission to re-ingest the source. The NLP system may display the answers already found at block 525 as well as statement that the answers may not be reliable (e.g., the confidence scores are low). The NLP system may also tell the user that a source that is related to the query (e.g., shares similar concepts) has recently published new data that could be re-ingested to possible find a better answer. Thus, the user can decide whether to wait for the NLP system to re-ingest the data source. The NLP system may also display the estimated time for ingesting the source which may influence the user's decision. Alternatively or additionally, the NLP system may provide a HTML link to the data source where the user can access the updated data source herself. In one embodiment, these options may also be provided to the user in the case where the NLP system is unable to find any answer to the query at block 515.

Assuming the supplemental data source is re-ingested, at block 535, the NLP system may evaluate the query using the updated corpus. In embodiments where the NLP system has already compared the query to the corpus, at block 535, the NLP system is performing the same process again but this time the corpus includes updated information from the re-ingested data source.

A Computing System for Hosting the NLP System

Figure 6:
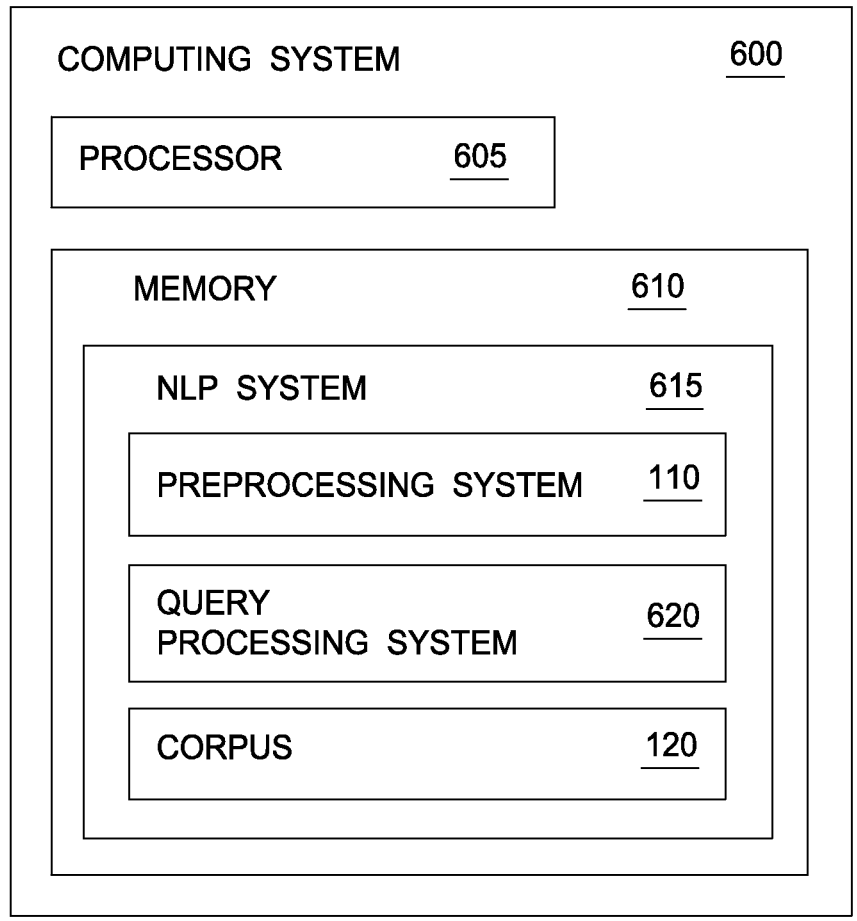
FIG. 6 is a system diagram of a NLP processing system, according to one embodiment described herein.

FIG. 6 is a system diagram of a NLP system 615, according to one embodiment described herein. As shown, NLP system 615 may be hosted on a computing system 600. Computing system 600 may include a single computing device in a single chassis (e.g., a server) or a plurality of computing devices that are interconnected. For example, computing system 600 may include multiple servers in a data center coupled to a storage-area network which are used when executing the NLP system 615. Accordingly, processor 605 and memory 610 may include multiple individual processors or memory elements that are distributed across the interconnected computing devices. Processor 605 represents any number of processor units that are capable of performing the functions described herein. Moreover, the processor units may be single core or multi-core units. Memory 610 may include non-volatile as well as volatile memory elements and may be shared by multiple computing devices in computing system 600.

As shown, memory 610 stores NLP system 615 which includes a preprocessing system 110, a query processing system 620, and a corpus 120. The description of the preprocessing system 110 and corpus 120 provided in FIG. 1 may also be applied here. The query processing system 620 may be tasked with comparing a query received by the NLP system 615 to corpus 120 in order to provide one or more answers to the query. The embodiments described herein are not limited to any particular NLP technique for implementing the query processing system 620 and may be applied to any technique that relies on a corpus to answer queries.

CONCLUSION

In some NLP systems, queries are compared to different data sources stored in a corpus to provide an answer to the query. However, the best data sources for answering the query may not currently be contained within the corpus or the data sources in the corpus may contain stale data that provides an inaccurate answer. When receiving a query, the NLP system may evaluate the query to identify a data source that is likely to contain an answer to the query. If the data source is not currently contained within the corpus, the NLP system may ingest the data source. If the data source is already within the corpus, however, the NLP may determine a time-sensitivity value associated with at least some portion of the query. This value may then be used to determine whether the data source should be re-ingested—e.g., the information contained in the corpus is stale.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
receiving a query for processing by a natural language processing (NLP) system comprising a corpus containing data ingested from a plurality of data sources, wherein the data is formatted and stored into one or more objects and organized based on topic changes;
identifying a data source expected to contain an answer to the query using NLP, by:
dividing words in the query into different elements, generating an annotation for each of the elements using the NLP system by determining a particular topic describing each of the elements, and
identifying a previously ingested data source in the corpus that is associated with previously-generated annotations matching the generated annotations for the elements;

upon determining that the previously ingested data in the corpus does not contain the answer to the query, determining whether new material has been added to the identified data source since the last time the identified data source was ingested into the corpus;

upon determining that new material has been added to the identified data source since the last time the identified data source was ingested into the corpus:

re-ingesting the identified data source using one or more computer processors whereby the new material is inserted into the corpus; and processing the query to determine a lexical answer type for the query, based at least in part on a concept assigned to each of the elements, wherein the concepts were determined and assigned using NLP, and wherein the lexical answer type is a word or noun phrase that predicts a type of an answer to the query; and generating an answer to the query based on the new material inserted into the corpus and based on the lexical answer type.

2. The method of claim 1, wherein determining that the ingested data in the corpus does not contain the answer to the query further comprises:

processing the query to determine if any of the data sources included in the corpus contain the answer to the query.

3. The method of claim 2, wherein determining whether the new material has been added to the identified data source since the last time the identified data source was ingested into the corpus is performed by the NLP system only if no answer is found when processing the query to determine if any of the data sources included in the corpus contain the answer to the query.

4. The method of claim 2, wherein determining that the ingested data in the corpus does not contain the answer to the query further comprises:

upon determining that the identified data source contains a possible answer to the query, determining a confidence score associated with the possible answer; and upon determining that the confidence score does not satisfy a confidence threshold, determining whether the new material has been added to the identified data source since the last time the identified data source was ingested into the corpus.

5. The method of claim 1, wherein identifying the data source expected to contain the answer to the query further comprises:

performing a concept mapping to assign a concept to at least one element in the query; and determining that the assigned concept of the at least one element in the query is related to a concept associated with the ingested data in the corpus from the data source.

6. The method of claim 5, wherein the corpus stores metadata describing each of the plurality of data sources, wherein the assigned concept of the at least one element in the query is related to the metadata description of the identified data source.

7. The method of claim 1, wherein the corpus comprises a plurality of data from different data sources, wherein the data from the different data sources is organized based on a common format of the corpus.

8. The method of claim 1, wherein the one or more features indicative of a topic change are one or more changes in text formatting in the corpus.

* * * * *